(12) United States Patent
Nam

(10) Patent No.: US 10,344,663 B2
(45) Date of Patent: Jul. 9, 2019

(54) CONTROL SYSTEM OF FLOWING AIR INTO VEHICLE ENGINE ROOM AND METHOD FOR THE SAME

(71) Applicant: HYUNDAI MOTOR COMPANY, Seoul (KR)

(72) Inventor: Jong Woo Nam, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 420 days.

(21) Appl. No.: 15/263,947

(22) Filed: Sep. 13, 2016

(65) Prior Publication Data

US 2017/0284275 A1    Oct. 5, 2017

(30) Foreign Application Priority Data

Mar. 30, 2016   (KR) .................. 10-2016-0038501

(51) Int. Cl.
*F01P 5/06* (2006.01)
*B60H 1/32* (2006.01)
(Continued)

(52) U.S. Cl.
CPC ............. *F01P 5/06* (2013.01); *B60H 1/3211* (2013.01); *B60H 1/3227* (2013.01); *B60K 11/04* (2013.01); *B60K 11/085* (2013.01); *F01P 7/10* (2013.01); *B60H 2001/3248* (2013.01); *B60H 2001/3255* (2013.01); *B60H 2001/3266* (2013.01);
(Continued)

(58) Field of Classification Search
CPC ........ F01P 5/02; F01P 5/06; F01P 7/10; F01P 11/10; F01P 1/00; F01P 2001/05; F01P 2025/13; F01P 2025/04; F01P 2050/22; F01P 2037/00; B60K 11/085; B60K 11/04; B60H 1/3227; B60H 1/3211;
(Continued)

(56) References Cited

U.S. PATENT DOCUMENTS

| 2,423,175 | A | * | 7/1947 | Churchill | ........... F01P 3/18 |
| | | | | | 123/41.48 |
| 3,552,483 | A | * | 1/1971 | North | ........... F01P 5/06 |
| | | | | | 123/41.04 |

(Continued)

FOREIGN PATENT DOCUMENTS

| JP | 2006-306226 A | 11/2006 |
| JP | 2007-118651 A | 5/2007 |

(Continued)

*Primary Examiner* — Grant Moubry
(74) *Attorney, Agent, or Firm* — Brinks Gilson & Lione

(57) ABSTRACT

The present disclosure relates to a system for controlling an air flow rate into a vehicle engine room. The system includes: an air intake port receiving an exterior air at a front portion of the vehicle and supplying the air into the engine room; air ducts formed at both sides of the air intake port and introduce the exterior air into a wheel side in order to improve aerodynamic characteristic; a control valve configured to selectively convey the air flowed in the air intake port into the air ducts; a radiator disposed between the air intake port and the engine room; and a control portion configured to control the control valve based on an operating state of vehicle. The air ducts are selectively communicated with the air intake port and disposed at upstream of the radiator.

20 Claims, 13 Drawing Sheets

(51) Int. Cl.
  *F01P 7/10* (2006.01)
  *B60K 11/04* (2006.01)
  *B60K 11/08* (2006.01)
(52) U.S. Cl.
  CPC .. *B60H 2001/3277* (2013.01); *F01P 2025/04* (2013.01); *F01P 2025/13* (2013.01); *F01P 2037/00* (2013.01); *F01P 2050/22* (2013.01); *Y02T 10/88* (2013.01)
(58) Field of Classification Search
  CPC .... B60H 2001/3277; B60H 2001/3248; B60H 2001/3266; B60H 2001/3255; Y02T 10/88
  See application file for complete search history.

(56) References Cited

U.S. PATENT DOCUMENTS

| | | | | |
|---|---|---|---|---|
| 3,696,730 | A * | 10/1972 | Masuda | B60K 11/00 180/68.1 |
| 4,723,594 | A * | 2/1988 | Koehr | B60K 11/04 123/196 AB |
| 5,280,852 | A * | 1/1994 | Dauvergne | B60H 1/00357 237/12.3 A |
| 7,603,968 | B2 * | 10/2009 | Pantow | B60K 11/02 123/41.04 |
| 8,939,126 | B2 * | 1/2015 | Li | F02M 35/10255 123/184.56 |
| 9,376,010 | B2 * | 6/2016 | Nam | B60K 11/04 |
| 9,574,529 | B2 * | 2/2017 | Nam | F02M 35/161 |
| 9,611,778 | B2 * | 4/2017 | Nam | F01P 3/02 |
| 9,738,152 | B2 * | 8/2017 | Yoon | B62D 35/005 |
| 9,802,475 | B2 * | 10/2017 | Wolf | B60K 11/085 |

FOREIGN PATENT DOCUMENTS

| | | |
|---|---|---|
| KR | 10-2005-0038890 A | 4/2005 |
| KR | 10-2013-0065176 A | 6/2013 |
| KR | 10-1490957 B1 | 2/2015 |
| KR | 10-1528919 B1 | 6/2015 |
| KR | 10-1542992 B1 | 8/2015 |

* cited by examiner

CONTROL SYSTEM OF FLOWING AIR INTO VEHICLE ENGINE ROOM AND METHOD FOR THE SAME

CROSS-REFERENCE TO RELATED APPLICATION

This application claims priority to and the benefit of Korean Patent Application No. 10-2016-0038501, filed on Mar. 30, 2016, the entire contents of which are incorporated herein by reference.

FIELD

The present disclosure relates to a system for controlling an air flow rate into a vehicle engine room and a control method thereof to improve cooling performance and aero-dynamic performance of a vehicle.

BACKGROUND

The statements in this section merely provide background information related to the present disclosure and may not constitute prior art.

In general, a radiator for cooling an engine and a condenser for condensing a refrigerant in an air conditioner are mounted in a vehicle, and temperatures of the radiator and the condenser are lowered by operating a cooling fan. It is advantageous to quickly raise a temperature of the engine to an appropriate level when the vehicle is initially started in order to improve fuel efficiency, and the temperature of the engine needs to be maintained at an appropriate temperature.

The cooling fan is traditionally operated by an operation of the engine, but this mechanical method has a drawback in that fuel efficiency of the vehicle deteriorates because the cooling fan is always operated whenever the engine is operated.

Recently, an electric motor is used, and the cooling fan is operated only when its operation is needed based on a driving state of the vehicle, such that the fuel efficiency is improved.

Meanwhile, aero-dynamic characteristics greatly affect fuel efficiency. When the vehicle travels at a high speed, drag is generated when air passes through the engine room.

The above information disclosed in this Background section is only for enhancement of understanding of the background of the present disclosure and therefore it may contain information that does not form the prior art that is already known to a person of ordinary skill in the art.

SUMMARY

The present disclosure provides a system for controlling an air flow rate into a vehicle engine room and a control method thereof, which may improve cooling performance and aero-dynamic performance of a vehicle.

In addition, the present disclosure may reduce drag by reducing an operation of a cooling fan, and shutting off air flowing into an engine room as desired.

One form of present disclosure provides a system for controlling an air flow rate into a vehicle engine room, the system including: an air intake port receiving an exterior air at a front portion of the vehicle and supplying the air into the engine room; air ducts formed at both sides of the air intake port and introduce the exterior air into a wheel side in order to improve aerodynamic characteristic; a control valve configured to selectively convey the air flowed in the air intake port into the air ducts; a radiator disposed between the air intake port and the engine room; and a control portion configured to control the control valve based on an operating state of vehicle. In particular, the air ducts are selectively communicated with the air intake port and disposed at upstream of the radiator.

The system for controlling an air flow into a vehicle engine room may include: a diversion passage formed between the air intake port and the air ducts and configured to supply the air flowed in the air intake port into the air ducts, and the control valve having one end which may be fixed at a valve shaft formed at interior circumference of the diversion passage and the other end configured to rotate in a forward and reverse directions such that the diversion passage is selectively opened or closed.

The control valve having one end which may be fixed at a valve shaft formed at interior circumference of the diversion passage and the other end configured to rotate in a forward and reverse directions such that the diversion passage is selectively opened or closed.

If the control valve is not operated, the control valve may be configured to maintain in a state of rotating in the forward direction, and the air flowed from the intake port may be fully supplied to the radiator.

If the control valve is operated, the control valve may be configured to rotate in the reverse direction in order to open the diversion passage, and some air flowed from the intake port may be supplied to the air ducts via the diversion passage.

The air ducts may include a front duct disposed at a front side of the vehicle in a length direction; a rear duct disposed at a rear side of the front duct and is configured to direct the air flowed from the front duct into the wheel side; the front duct may be formed in a streamlined shape so as to smoothly receive the air from the front side of the vehicle and the more the front duct is positioned at front side, the more the front duct may be bent toward an inside of the vehicle, and the rear duct may be formed in a shape such that the more the rear duct may be positioned at rear side, the more the rear duct is bent toward an outside of the vehicle.

A guide plate may be disposed at a downstream of the rear duct in order to guide the air into the wheel side.

The air flowed out from the rear duct may be directed to the outside of the vehicle while having a predetermined angle with a surface of a wheel.

In another form of the present disclosure, the system for controlling an air flow into a vehicle engine room may include: a fan shroud in which a cooling fan including a fan motor and a fan blade is mounted; a rotary shutter which is provided in the fan shroud while corresponding to an operation area of the fan blade, and in which an area through which air passes is varied in a circumferential direction; and a plurality of flaps which is provided in the fan shroud, and opens and closes a part of a portion where the rotary shutter is not mounted; and the control unit may control an open area of the rotary shutter, operations of opening and closing the plurality of flaps, an operation of the cooling fan, and an operation of the control valve based on an operating state of a vehicle.

The rotary shutter may include a plurality of shutter blades which are provided to be rotatable about a rotation shaft; and a shutter actuator which rotates the plurality of shutter blades, and changes an area through which air passes. The shutter blades may include an operation blade which is rotated about the rotation shaft by an operation of the shutter actuator; and a plurality of sub blades which are provided to be superimposed on the basis of the rotation shaft so as to be spread or folded fanwise in accordance with rotation of the operation blade.

The shutter blades may have at least one operation protrusion, respectively, and when the operation blade is spread or folded, any one of the plurality of sub blades may be spread or folded, and the remaining sub blades may be sequentially spread or folded.

Electromagnets may be provided on the plurality of flaps so that the plurality of flaps is opened and closed in accordance with an electric current supplied to the electromagnets.

The fan shroud in which the rotary shutter and the plurality of flaps may be provided is provided between an engine and a radiator.

A system for controlling an air flow rate into a vehicle engine room may include an encapsulation which surrounds the engine room.

Operation modes of the system for controlling an air flow rate into a vehicle engine room may include: a first mode in which the plurality of flaps are closed, the rotary shutter is fully closed, and the operation of the cooling fan and the control valve are turned off; a second mode in which the plurality of flaps are closed, the rotary shutter is fully opened, and the operation of the cooling fan and the control valve are controlled based on an operating state of the vehicle; a third mode in which the plurality of flaps are opened, the rotary shutter is fully opened, the operation of the cooling fan is turned off, and the operation of the control valve is turned on; and a fourth mode in which the plurality of flaps are closed, the open area of the rotary shutter is controlled, the operation of the cooling fan is turned off and the operation of the control valve is controlled based on the operation state of the vehicle.

In the second and fourth modes, when the vehicle speed is in an acceleration state, the control valve may control the diversion passage to be opened, and when the vehicle speed is constant, the control valve controls the diversion passage to be closed.

A system for controlling an air flow into a vehicle engine room may include an atmospheric temperature sensor which measures an atmospheric temperature, and outputs a corresponding signal; a speed sensor which measures a vehicle speed, and outputs a corresponding signal; an air conditioning pressure sensor which measures air conditioning internal pressure, and outputs a corresponding signal; an air conditioning switch sensor which measures an operational signal of an air conditioning switch, and outputs a corresponding signal; a refrigerant temperature sensor which measures a refrigerant temperature, and outputs a corresponding signal; and a position sensor which measures the open area of the rotary shutter, and outputs a corresponding signal, the control unit may determine the operating state of the vehicle based on the corresponding signals from the respective sensors, and may control operations of the rotary shutter, the plurality of flaps, the cooling fan, and the control valve in accordance with the operating state of the vehicle in any one mode of the first to fourth modes.

A system for controlling an air flow rate into a vehicle engine room may include an intercooler temperature sensor which measures a temperature of an intercooler, and may output a corresponding signal, the control unit further receives a signal from the intercooler temperature sensor so as to determine the operating state of the vehicle, and control operations of the rotary shutter, the plurality of flaps, the cooling fan, and the control valve in any one mode of the first to fourth modes.

In another form, a control method of a system for controlling an air flow rate into a vehicle engine room is provides, and the system may include: an atmospheric temperature sensor which measures an atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, a refrigerant temperature sensor which measures a refrigerant temperature, and outputs a corresponding signal, a fan shroud in which a cooling fan including a fan motor and a fan blade is mounted, a rotary shutter which is provided in the fan shroud while corresponding to an operation area of the fan blade, and in which an area through which air passes is varied in a circumferential direction, a position sensor which measures an open area of the rotary shutter, and outputs a corresponding signal, a plurality of flaps which is provided in the fan shroud, and opens and closes a part of a portion where the rotary shutter is not mounted, and an air intake port receiving an exterior air at a front portion of the vehicle and supplying the air into the engine room; air ducts formed at both sides of the air intake port and introduce the exterior air into a wheel side in order to improve aerodynamic characteristic; a control valve configured to selectively convey the air flowed in the air intake port into the air ducts; and a control unit controls an open area of the rotary shutter, operations of opening and closing the plurality of flaps, an operation of the cooling fan, and an operation of the control valve in accordance with an operating state of a vehicle.

The control method of a system for controlling an air flow into the vehicle engine room may include: determining, by the control unit, the operating state of the vehicle based on sensor signals including signals of the atmospheric temperature sensor, the speed sensor, the air conditioning pressure sensor, the air conditioning switch sensor, the refrigerant temperature sensor, and the position sensor, and determining whether it is desired to fully close the rotary shutter based on the determined operating state of the vehicle; and fully closing, by the control unit, the rotary shutter, closing the plurality of flaps, turning off the operation of the cooling fan, and turning on the operation of the control valve in a state in which it is desired to fully close the rotary shutter.

The control method may include turning off the control valve to cut off a diversion passage; determining, by the control unit, whether the operating state of the vehicle corresponds to a predetermined low-speed and high-load condition when it is not desired to fully close the rotary shutter; and fully opening, by the control unit, the rotary shutter, closing the plurality of flaps, and controlling the operation of the cooling fan and the control valve in accordance with the operating state of the vehicle when the operating state of the vehicle corresponds to the predetermined low-speed and high-load condition.

In a case in which the operating state of the vehicle corresponds to the predetermined low-speed and high-load condition, by the control unit, the control valve may open the diversion passage when the vehicle speed is in an acceleration state, and close the diversion passage when the vehicle speed is in a constant state.

The control method of the system for controlling the air flow rate may include determining, by the control unit, whether the operating state of the vehicle corresponds to a predetermined high-speed and high-load condition in a case in which the operating state of the vehicle does not correspond to the predetermined low-speed and high-load condition; and fully opening, by the control unit, the rotary shutter, opening the plurality of flaps, turning off the operation of the cooling fan, turning on the control valve when the operating state of the vehicle corresponds to the predetermined high-speed and high-load condition.

The control method of the system for controlling the air flow may include controlling, by the control unit, the operation of the control valve in accordance with an operating state of a vehicle; and closing, by the control unit, the plurality of flaps, turning off the operation of the cooling fan, and controlling an open area of the rotary shutter in accordance with the operating state of the vehicle when the operating state of the vehicle does not correspond to the predetermined high-speed and high-load condition.

In a case in which it is not desired to fully close the rotary shutter and the operating state of the vehicle does not corresponds to the predetermined low-speed and high-load condition, the control valve may open the diversion passage when the vehicle speed is in an acceleration state, and close the diversion passage when the vehicle speed is in a constant state.

In another form, the system for controlling the air flow into the vehicle engine room may further include an intercooler temperature sensor which measures a temperature of an intercooler, and outputs a corresponding signal, and the control unit may determine the operating state of the vehicle based on additional signal of the intercooler temperature sensor.

As described above, according to the system for controlling an air flow into a vehicle engine room and a control method thereof, cooling performance may be improved by controlling the cooling fan based on the driving state of the vehicle, and aero-dynamic performance may be improved by adjusting an amount of air flowing into the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8A:
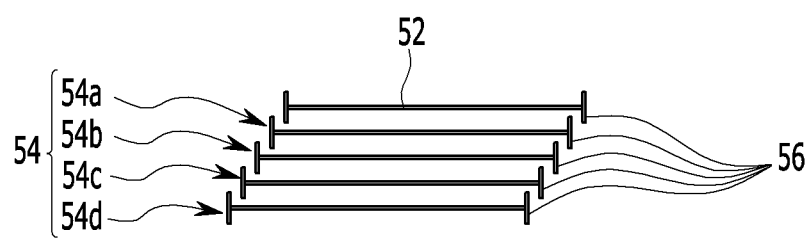
Figure 8B:
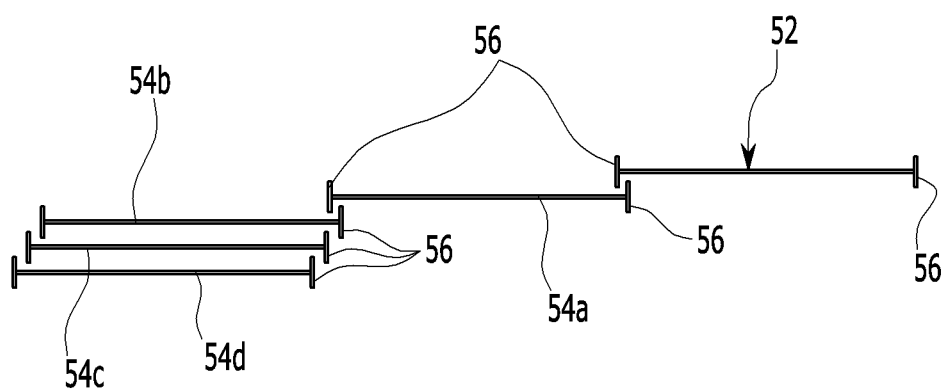
Figure 9A:
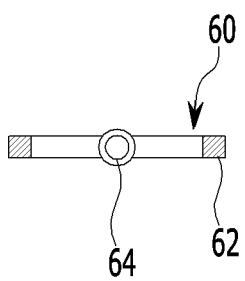
Figure 9B:
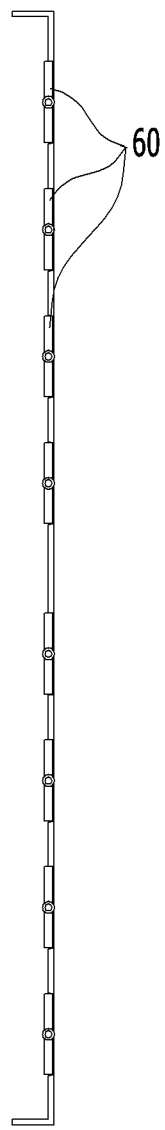
Figure 9C:
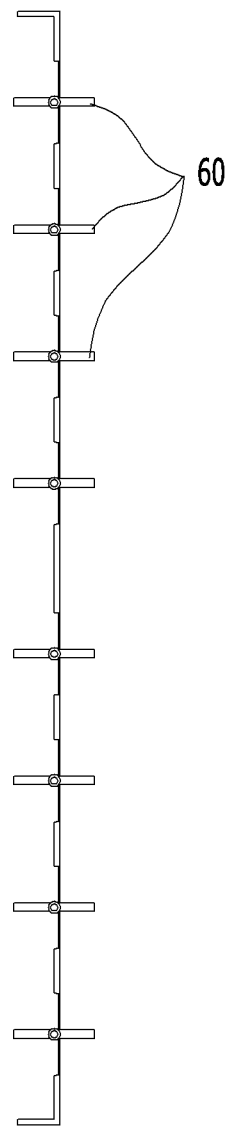

FIGS. 7A and 7B, and FIGS. 8A and 8B are views illustrating a rotary shutter of the system for controlling an air flow rate into a vehicle engine room according to one form of the present disclosure; and FIGS. 9A-9C are views illustrating a flap of the system for controlling an air flow rate into a vehicle engine room according to one form of the present disclosure.

Figure 10:
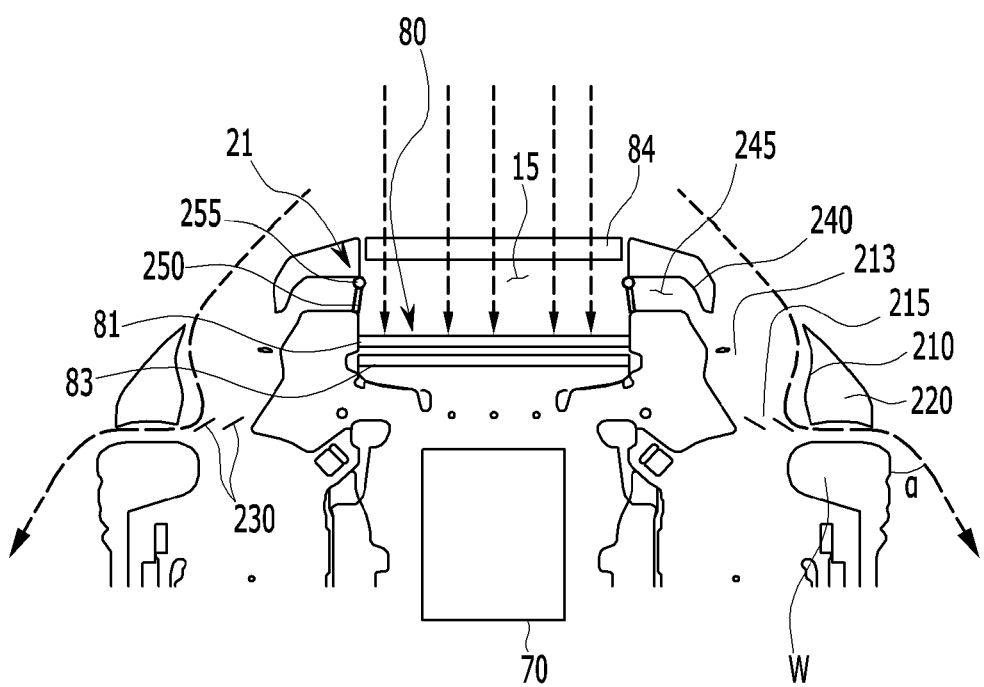
Figure 11:
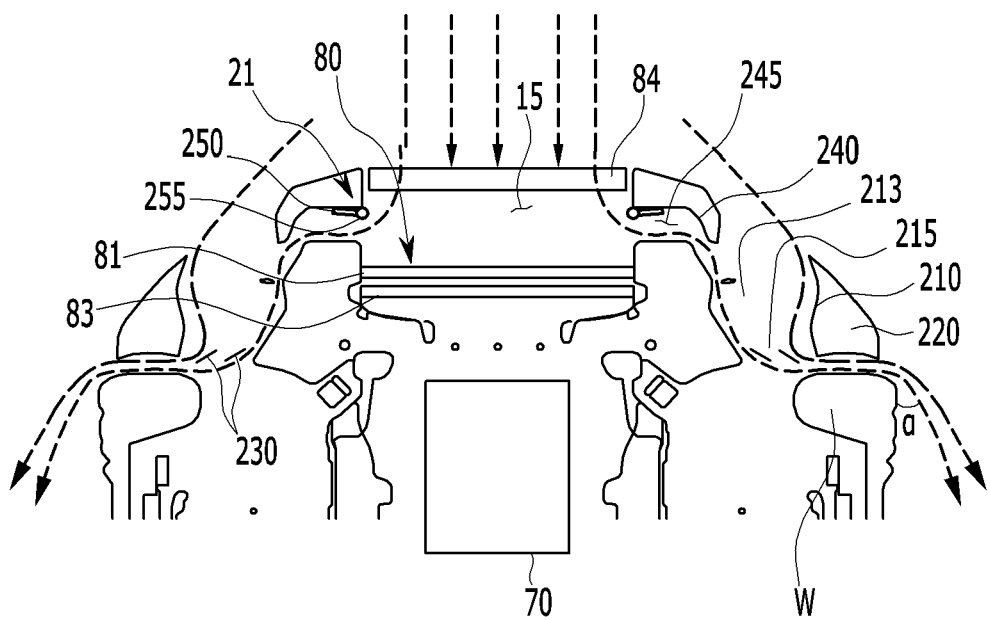

FIG. 10 and FIG. 11 are views illustrating operation modes of a control valve of the system for controlling an air flow rate into a vehicle engine room according to the present disclosure.

Figure 12A:
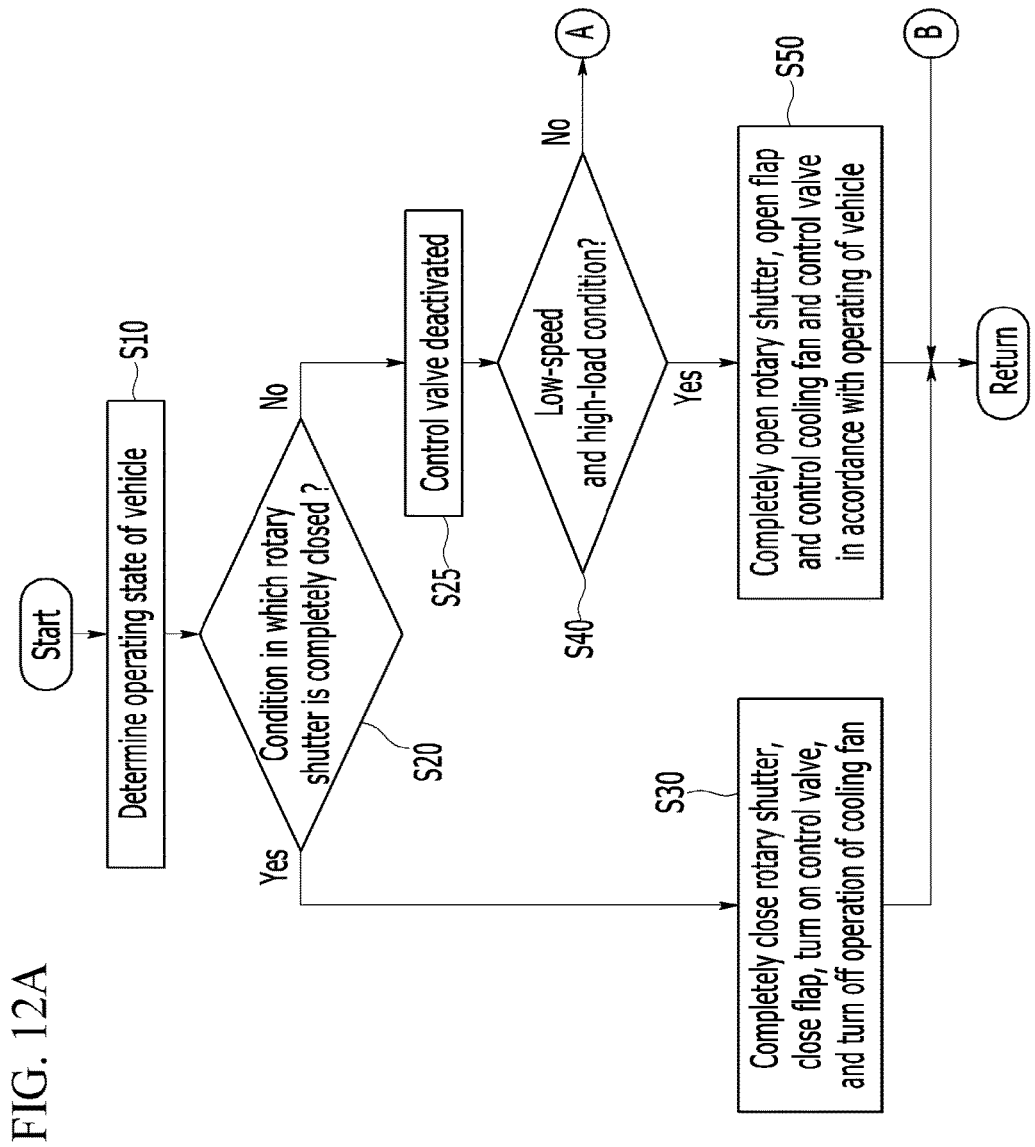
Figure 12B:
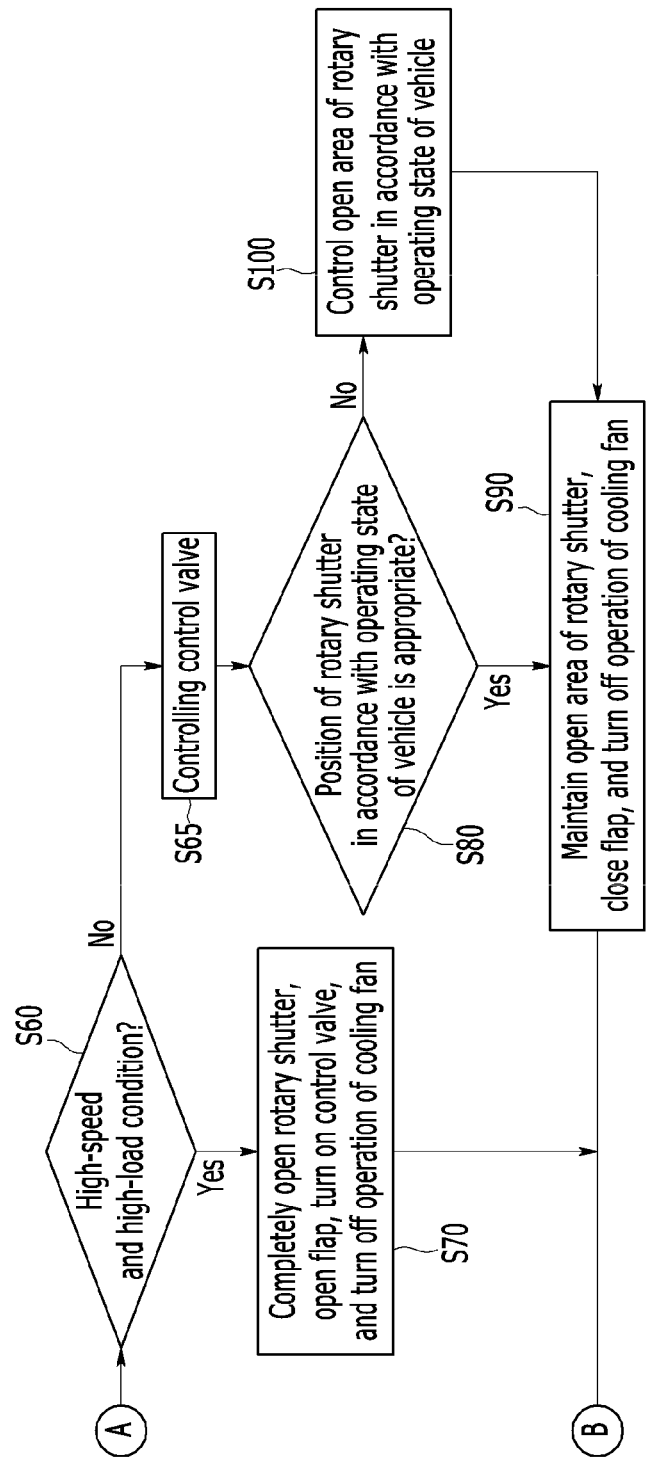

FIG. 12A and FIG. 12B are flowcharts illustrating a control method of the system for controlling an air flow rate into a vehicle engine room according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure In the drawings, the thickness of layers, films, panels, regions, etc., are exaggerated for clarity.

Throughout the specification and the claims, unless explicitly described to the contrary, the word "comprise" and variations such as "comprises" or "comprising" will be understood to imply the inclusion of stated elements but not the exclusion of any other elements.

Figure 1:
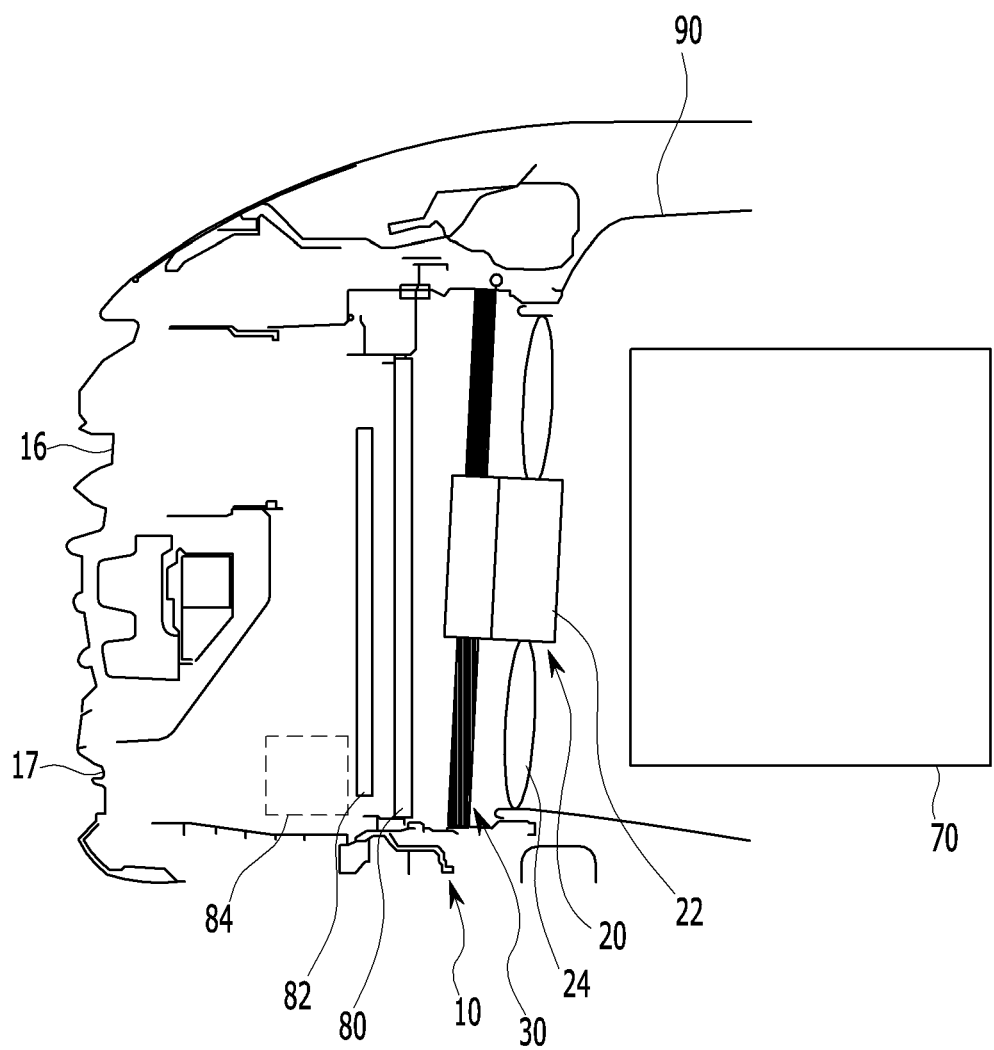
FIG. 1 is a cross-sectional view illustrating a system for controlling an air flow rate into a vehicle engine room according to one form of the present disclosure.
Figure 2:
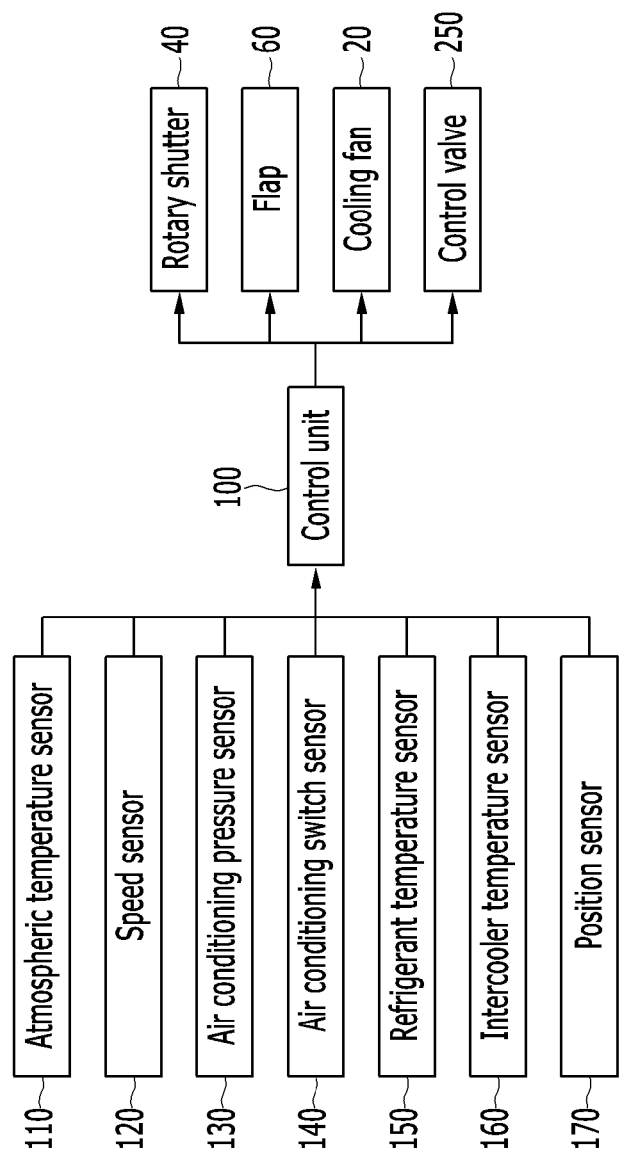
FIG. 2 is a block diagram illustrating the system for controlling an air flow rate into a vehicle engine room according to the present disclosure.

FIG. 1 is a cross-sectional view illustrating a system for controlling an air flow rate into a vehicle engine room, and FIG. 2 is a block diagram illustrating the system for controlling an air flow rate into a vehicle engine room.

FIGS. 3 to 6 are views illustrating an operating state of a rotary shutter of the system for controlling an air flow rate into a vehicle engine room, and FIGS. 7A and 7B, and FIGS. 8A and 8B are views illustrating the rotary shutter of the system for controlling an air flow rate into a vehicle engine room.

FIGS. 9A-9C are views illustrating a flap of the system for controlling an air flow rate into a vehicle engine room.

FIG. 10 and FIG. 11 are views illustrating operation modes of a control valve of the system for controlling an air flow rate into a vehicle engine room.

Referring to FIGS. 1 to 11, the system for controlling an air flow rate into a vehicle engine room according to one form of the present disclosure may include: a fan shroud 30 in which a cooling fan 20 including a fan motor 22 and fan blades 24 is mounted; a rotary shutter 40 which is provided in the fan shroud 30 while corresponding to an operation area of the fan blade 24, and in which an area through which air passes is varied in a circumferential direction; a plurality of flaps 60 which are provided in the fan shroud 30, and opens and closes a part of a portion where the rotary shutter 40 is not mounted; and a control unit 100 which controls an open area of the rotary shutter 40, operations of opening and closing the plurality of flaps 60, and an operation of the cooling fan 20 in accordance with an operating state of a vehicle.

The fan shroud 30 in which the rotary shutter 40 and the plurality of flaps 60 are provided may be provided between an engine 70 and a radiator 80.

A condenser 82 may be provided in front of the radiator 80, and an intercooler 84 may be provided in front of the condenser 82.

In addition, the system for controlling an air flow rate into a vehicle engine room may further include an encapsulation 90 that surrounds the engine room, and the encapsulation 90 serves to inhibit or prevent noise and vibration generated in the engine 70 from being transmitted to the outside of the vehicle body 10, and reduce drag by guiding wind, which is generated when the vehicle travels, when the wind flows into the engine room.

In addition, the encapsulation 90 preserves heat generated in the engine 70, and may enable the engine 70 to be operated at an appropriate operation temperature when the vehicle travels again in a predetermined time after the vehicle stops.

FIG. 10 and FIG. 11 are illustrating a flow of an air in a length direction of vehicle.

A front end module (FEM; 21) which assembles many components into one module is provided on a front side of the vehicle, and a first duct 210 is disposed at both sides of the FEM.

When the vehicle is driving, the air is selectively flowed into the first air duct 210 disposed at both sides of a front portion of the vehicle or flowed through an air intake port 15 in the FEM 21 via a radiator grill 16 and bumper hole 17.

The first air duct 210 includes a front duct 213 disposed at a front side in a length direction of the vehicle and a rear duct 215 disposed at a rear side.

The front duct 213 is formed in a streamlined shape so as to reduce air resistance at a front side of vehicle and becomes gradually more bent toward the inside of the vehicle as it is positioned at a front side of the vehicle. Accordingly, the front duct 213 may smoothly take an exterior air from the front side of the vehicle, thereby aerodynamic performance of air passing through the front duct 213 may be improved.

The rear duct 215 is a portion formed at relatively rearward at the first air duct 210 so as to receive the air passing through the front duct 213 and is formed in a streamlined shape which gradually more bent toward an outside of the vehicle as it is positioned at the rear side of the vehicle. In one form, the rear duct 215 may be integrally formed with the wheel housing 220 and may reduce the air resistance and introduce the air flow into the wheel W.

Meanwhile, a guide plate 230 guiding flow direction of the air supplied into the rear duct 215 may be provided at downstream of the rear duct 215, and the guide plate 230 may direct the air of the rear duct 215 into the wheel W. At this time, the guide plate 230 makes the air flowed out from the rear duct 215 form an air curtain in front of the wheel W and the air is directed by a predetermined angle "a" to a side surface of the wheel W. The predetermined angle "a" is set in order to increase an effect of the air curtain.

According to one form of the present disclosure, an air-cooled type of intercooler 84 is disposed in front of the engine 70 to being cooled first by the exterior air, however, it is not limited thereto. For example, an air flap (not shown) may be provided and the air flap may control the air flowed in the air intake port 15.

And the air flowed into the air intake port 15 may cool the intercooler 84 and the radiator 80, and is introduced to the engine 70 positioned therein. In other words, the intercooler 84 and the radiator 80 is disposed on the air intake port 15.

The intercooler 84 may cool an aspirated air by a turbocharger (not shown). The turbocharger is adapted to drive a turbine by inhaling exhaust gas or exterior air and supplying compressed air having high temperature to cylinders of the engine 70.

The radiator 80 include a high temperature radiator 81 which cools a coolant passing through the engine 70 and a low temperature radiator 83 which releases remaining heat of a low temperature coolant, it is well-known to a person of an ordinary skill in the art, so a detailed description thereof will be omitted.

In another form of the present disclosure, a second air duct 240 is provided at a rear surface of the FEM 21 so as to supply the air flowed in the air intake port 15 into the first air duct 210. The second air duct 240 may forms a diversion passage 245 such that some air flowed into the air intake port 15 is flowed to the first air duct 210. In addition, the control valve 250 is provided at an upstream side of the diversion passage 245 in order to selectively supply the air from the air intake port 15 into the first air duct 210. In other words, the control valve 250 may be controlled to supply or not to supply the air flowed in the air intake port 15 into the front duct 213 according the operation state of the vehicle.

The control valve 250 may be different types of valve including a solenoid valve. For example, an end of control valve 250 is fixed at a valve shaft 255 formed at interior circumference of the diversion passage 245, the other end of control valve 250 may selectively open or close the diversion passage 245 as rotating in an one or the other direction.

If the control valve 250 close the diversion passage 245 as rotating in one direction, as indicated by a dotted line in the FIG. 10, the air flowed in the air intake port 15 is directed into the radiator 80 through the grill 16 or bumper hole 17. This operation state of control valve 250 may be suitable when the vehicle is desired more cooling performance even if the air resistance is somewhat generated in the engine room. In other words, when the engine 70 is in a state of high load, the air flowed in the air intake port 15 is transferred to the radiator as the control valve 250 closes the diversion passage 245. Thereby, the engine room may be effectively cooled.

Whereas, if the control valve 250 opens the diversion passage 245 as rotating in the other direction, as indicated by a dotted line in the FIG. 11, some air flowed in the air intake port 15 is directed into wheel W passing through the second air duct 240. Accordingly, when the control valve 250 opens the diversion passage 245, the air amount flowed in the engine room is decreased and the aerodynamic performance of vehicle may be improved. This operation state of control valve 250 may be suitable when the vehicle is driving at high speed and low load state.

Referring to FIG. 2, the system for controlling an air flow rate into a vehicle engine room may include: an atmospheric temperature sensor 110 which measures an atmospheric temperature, and outputs a corresponding signal; a speed sensor 120 which measures a vehicle speed, and outputs a corresponding signal; an air conditioning pressure sensor 130 which measures air conditioning internal pressure, and outputs a corresponding signal; an air conditioning switch sensor 140 which measures an operational signal of an air conditioning switch, and outputs a corresponding signal; a refrigerant temperature sensor 150 which measures a refrigerant temperature, and outputs a corresponding signal; and a position sensor 170 which measures an open area of the rotary shutter 40, and outputs a corresponding signal.

The control unit 100 determines the operating state of the vehicle based on the corresponding signals from the respective sensor and additional sensors as desired, and controls operations of the rotary shutter 40, the plurality of flaps 60, the cooling fan 20, and the control valve 250 in accordance with the operating state of the vehicle.

The system for controlling an air flow rate into a vehicle engine room further includes an intercooler temperature sensor 160 which measures a temperature of the intercooler 84, and outputs a corresponding signal, and the control unit 100 may further receive a signal from the intercooler temperature sensor 160 so as to determine the operating state of the vehicle, and control operations of the rotary shutter 40, the plurality of flaps 60, the cooling fan 20, and the control valve 250.

Referring to FIG. 1, and FIGS. 3 to 8B, the rotary shutter 40 includes a plurality of shutter blades 50 which are provided to be rotatable about the same rotation shaft 42, and a shutter actuator 44 which rotates the plurality of shutter blades 50, and changes an area through which air passes.

In one form, the shutter actuator 44 may be a servo motor capable of being rotated in forward and reverse directions, and may be mounted in the fan shroud 30 by mounting supporters 45.

The shutter blades 50 include an operation blade 52 which is rotated about the rotation shaft 42 by an operation of the shutter actuator 44, and a plurality of sub blades 54 which are provided to be superimposed on the basis of the rotation shaft 42 so as to be spread fanwise or folded in accordance with the rotation of the operation blade 52.

FIGS. 8A and 8B are views illustrating sides of the shutter blades 50. Referring to FIGS. 8A and 8B, the shutter blades 50 have operation protrusions 56, respectively, and when the operation blade 52 is spread or folded, any one of the plurality of sub blades 54 may be spread or folded, and then the remaining sub blades 54 may be sequentially spread or folded.

As illustrated in FIGS. 7A-7B and 8A-8B, the operation blade 52 and the sub blades 54 are superimposed on the basis of the rotation shaft 42, and when the operation blade 52 is rotated about the rotation shaft 42 at a predetermined angle by an operation of the shutter actuator 44, the sub blade 54a, which is closest to the operation blade 52, is rotated while the protrusion 56 of the sub blade 54a is caught by the protrusion 56 of the operation blade 52.

By this manner, the respective sub blades 54a, 54b, 54c, and 54d illustrated in the drawings are sequentially spread fanwise.

On the contrary, when the shutter actuator 44 rotates the operation blade 52 in the reverse direction, the sub blade 54a, which is closest to the operation blade 52, is rotated in the reverse direction while the protrusion 56 of the sub blade 54a is pushed by the opposite protrusion 56 of the operation blade 52.

By this manner, the respective sub blades 54a, 54b, 54c, and 54d illustrated in the drawings are sequentially folded.

Mounting protrusions 58 may be formed on the sub blade 54d that is positioned at the very end among the sub blades 54 so that the sub blade 54d may be fixed to the fan shroud 30.

Referring to FIGS. 9A-9C, electromagnets 62 are provided on the plurality of flaps 60, such that the plurality of flaps 60 may be opened and closed in accordance with an electric current supplied to the electromagnets 62, and flap rotation shafts 64 are provided on the flaps 60, respectively, so that the flaps 60 may be rotated about the rotation shafts 64, respectively.

The flap rotation shaft 64 may be a torsion spring, and the flap 60 may be maintained in an opened state when the electric current is not supplied to the electromagnet 62. In the case of failure of an electric current supply device, the flap 60 is maintained in the opened state so as to inhibit or prevent the engine 70 from being overheated.

FIGS. 3 to 6 are views illustrating operation modes of the system for controlling an air flow rate into a vehicle engine room according to the present disclosure.

Figure 3:
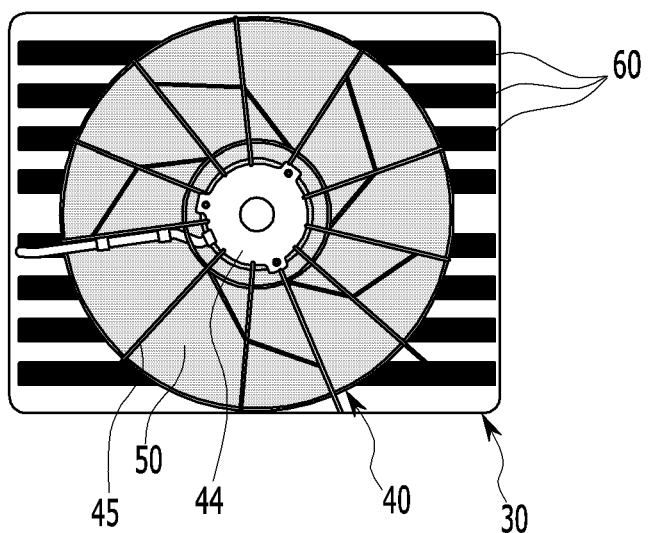
FIGS. 3 to 6 are views illustrating operation modes of the system for controlling an air flow rate into a vehicle engine room according to the present disclosure.

The operation mode illustrated in FIG. 3 shows a state in which the plurality of flaps 60 are closed, and the rotary shutter 40 is completely closed, and in this case, the operation of the cooling fan 20 may be turned off.

Figure 4:
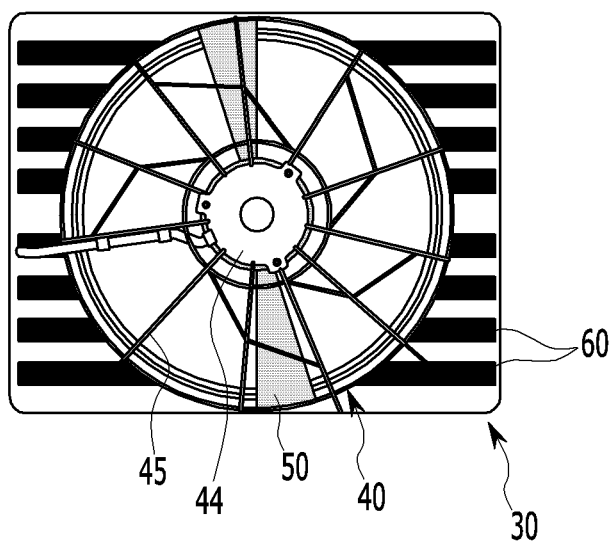

The operation mode illustrated in FIG. 4 shows a state in which the plurality of flaps 60 are closed, and the rotary shutter 40 is completely opened, and in this case, the operation of the cooling fan 20 may be controlled based on the operating state of the vehicle.

Figure 5:
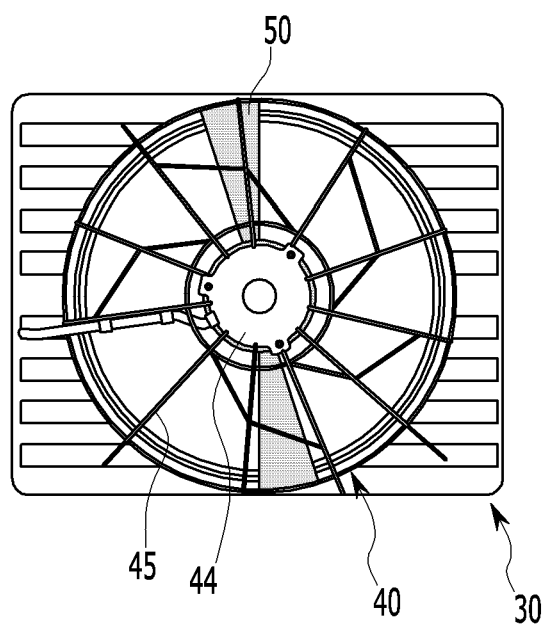

The operation mode illustrated in FIG. 5 shows a state in which the plurality of flaps 60 are opened, and the rotary shutter 40 is completely opened, and in this case, the operation of the cooling fan 20 may be turned off.

Figure 6:
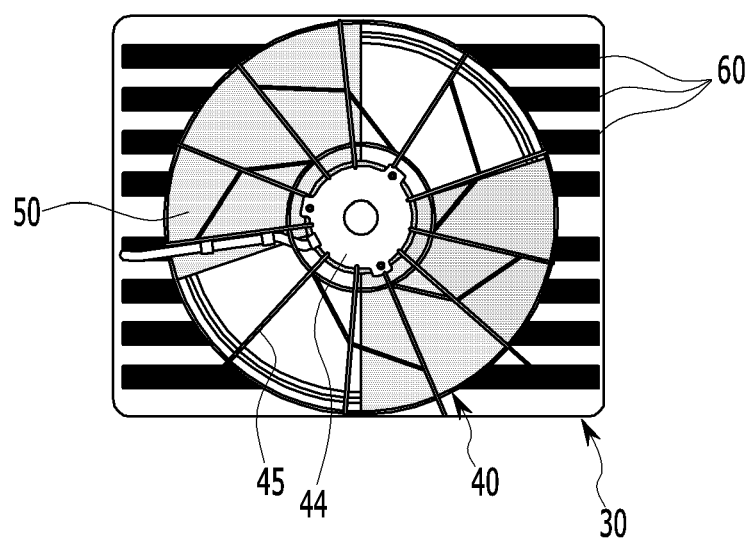
Figure 7A:
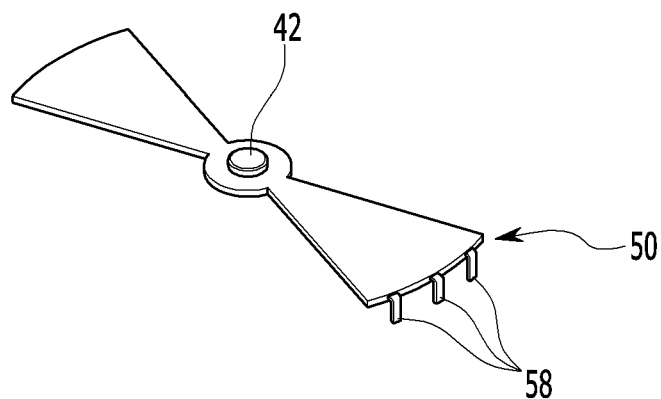
Figure 7B:
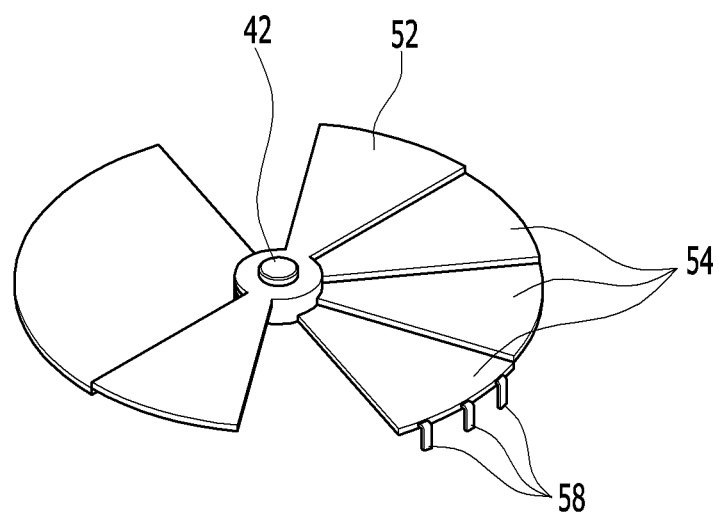

The operation mode illustrated in FIG. 6 shows a state in which the plurality of flaps 60 are closed, and an open area of the rotary shutter 40 is controlled, and in this case, the operation of the cooling fan 20 may be turned off.

FIG. 12A and FIG. 12B are flowcharts illustrating a control method of the system for controlling an air flow rate into a vehicle engine room according to one form of the present disclosure.

Hereinafter, the control method of the system for controlling an air flow rate into a vehicle engine room according to the exemplary form of the present disclosure will be described with reference to FIGS. 3 to 12.

The control unit 100 determines the operating state of the vehicle based on sensor signals including signals from the atmospheric temperature sensor 110, the speed sensor 120, the air conditioning pressure sensor 130, the air conditioning switch sensor 140, and the refrigerant temperature sensor 150 at step S10, and determines whether it is desired to completely close the rotary shutter 40 based on the determined operating state of the vehicle at step S20.

The state in which it is desired to completely close the rotary shutter 40 is a state in which cooling is not desired, and for example, may be a state in which it is desired to warm up the engine 70 for a predetermined time after the engine of the vehicle starts, a state in which it is desired to maintain a temperature of the engine 70 by turning off the engine, and a state in which the vehicle travels in a low-speed and low-load state. The corresponding condition may be stored in a predetermined map in advance, and the control unit 100 may compare the map with the operating state of the vehicle so as to determine whether it is desired to completely close the rotary shutter 40.

In a case in which it is desired to completely close the rotary shutter, the control unit 100 completely closes the rotary shutter 40, closes the plurality of flaps 60, turns off the operation of the cooling fan 20, and operates the control valve 250 at step S30. In an initial state of the control valve 250, the control valve 250 is configured to close the diversion passage 245, and after that, the control valve 250 is operated when the vehicle is in the state that cooling is not required as described above. If the control valve 250 is operated, then the control valve 250 is opened so as to supply the air flowed in the air intake port 15 into the diversion passage 245 as step 30 as shown in the FIG. 11.

In this case, it is possible to warm up the engine 70 and maintain an appropriate temperature, and aero-dynamic characteristics may be improved by shutting off air flowing into the engine room because the rotary shutter 40 and the plurality of flaps 60 are closed. Particularly, the air flowed in the air intake port is directed to the wheel W by opening the control valve 250, and the air curtain effect is generated. Therefore, it is capable of inhibiting or preventing from excessive air being flowing into the engine room, and the air of the air intake port 15 is detoured, thereby additional aero-dynamic performance may be expectable.

In a case in which it is not desired to completely close the rotary shutter, the control valve 250 maintain the initial state (the control valve 250 is not operated), which blocks the diversion passage 245 at step S25. And after that, the control portion 100 determines whether the operating state of the vehicle corresponds to a predetermined at low-speed and high-load condition at step S40.

In a case in which the operating state of the vehicle corresponds to the low-speed and high-load condition, the control unit 100 completely opens the rotary shutter 40, closes the plurality of flaps 60, and controls the operation of the cooling fan 20 and the control valve 250 in accordance with the operating state of the vehicle at step S50.

For example, the predetermined low-speed and high-load condition may mean a state in which a vehicle speed is approximately 30 to 40 kph, and an engine RPM is approximately 2000 to 4000, or may be defined as a state in which cooling by the operation of the cooling fan 20 is desired. That is, the low-speed and high-load condition may be defined as a condition in which cooling is desired, but cooling by the wind, which is generated when the vehicle travels, is not sufficient.

The corresponding condition is stored in the predetermined map, the control unit 100 may compare the map with the operating state of the vehicle so as to determine whether it is desired to operate the cooling fan 20, and the control unit 100 controls the operation of the cooling fan 20 in accordance with the operating state of the vehicle.

The control unit 100 may operate the cooling fan 20 while determining the number of revolutions of the cooling fan 20 based on the predetermined map, or the control unit 100 may continuously or intermittently operate the cooling fan 20 while determining an operation time of the cooling fan 20.

The control valve 250 may be opened when the vehicle in an acceleration speed state, and be closed when the vehicle is in a constant speed state. In other words, in a case in which the vehicle speed is constant, the control valve 250 is opened to improve the aerodynamic characteristic. Whereas, in a case in which the vehicle speed is in an acceleration state, the control valve 250 closes the diversion passage 245 to cool the vehicle smoothly.

In a case in which the operating state of the vehicle does not correspond to the low-speed and high-load condition, the control unit 100 determines whether the operating state of the vehicle corresponds to a predetermined high-speed and high-load condition at step S60. In a case in which the operating state of the vehicle corresponds to the high-speed and high-load condition, the control unit 100 fully opens the rotary shutter 40, opens the plurality of flaps 60, and turns off the operation of the cooling fan 20 at step S70. At this time, the control portion 100 may fully open the control valve 250 to improve the aerodynamic characteristic, and the power performance may be increased.

For example, the predetermined high-speed and high-load condition may mean a state in which a vehicle speed is approximately 90 to 110 kph, and an engine RPM is approximately 2000 to 4000, or may be defined as a condition in which cooling is desired, and cooling by the wind, which is generated when the vehicle travels, is sufficient.

The corresponding condition is stored in the predetermined map, and the control unit 100 may compare the map with the operating state of the vehicle so as to determine whether cooling by the wind, which is generated when the vehicle travels, is desired.

In a case in which the operating state of the vehicle does not correspond to the high-speed and high-load condition, the control unit 100 controls the control valve 250 based on the operation state of the vehicle at step S65. That is, the control valve 250 may be opened when the vehicle in an acceleration speed state, and be closed when the vehicle is in a constant speed state.

In addition, the control portion 100 closes the plurality of flaps 60, turns off the operation of the cooling fan 20, and controls the open area of the rotary shutter 40 based on the operating state of the vehicle at steps S80, S90, and S100.

That is, based on the operating state of the vehicle, the control unit 100 determines whether cooling is desired, the operation of the cooling fan 20 is not needed, and the wind flowing into the vehicle needs to be controlled.

The corresponding condition is stored in the predetermined map, the control unit 100 may compare the map with the operating state of the vehicle so as to determine whether the operation of the rotary shutter 40 is desired, and the control unit 100 determines the open area of the rotary shutter 40 in accordance with the operating state of the vehicle, and controls the opening operation of the rotary shutter 40.

The control unit 100 determines whether a position of the rotary shutter 40, that is, the open area of the rotary shutter 40 is appropriate using the position sensor 170. That is, the control unit 100 determines whether the rotary shutter 40 corresponds to the determined open area of the rotary shutter 40 at step S80. In a case in which the current open area of the rotary shutter 40 does not correspond to the determined open area of the rotary shutter 40, the control unit 100 controls the operation of the shutter actuator 44, and controls the open area of the rotary shutter 40 at step S100.

Further, the control unit 100 closes the plurality of flaps 60, turns off the operation of the cooling fan 20, and maintains the open area of the rotary shutter 40 at step S90.

In a case in which the intercooler 84 is mounted on the engine 70, the control unit 100 may further include the corresponding signal of the intercooler temperature sensor 160 so as to determine the operating state of the vehicle.

As described above, according to the system for controlling an air flow rate into a vehicle engine room according to the one form of the present disclosure and a control method thereof, cooling performance may be improved by controlling use of the cooling fan based on the driving state of the vehicle, and aero-dynamic performance may be improved by adjusting an amount of air flowing into the vehicle.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

| <Description of symbols> | |
|---|---|
| 10: vehicle body | 15: air intake port |
| 20: cooling fan | 21: front end module |
| 22: fan motor | 24: fan blade |
| 30: fan shroud | 40: rotary shutter |
| 42: rotation shaft | 44: shutter actuator |
| 45: mounting supporter | 50: shutter blade |
| 52: operation blade | 54: sub blade |
| 56: operation protrusion | 58: mounting protrusion |
| 60: flap | 62: electromagnet |
| 64: flap rotation shaft | 70: engine |
| 80: radiator | 82: condenser |
| 84: intercooler | 90: encapsulation |
| 100: control portion | 110: atmospheric temperature sensor |
| 120: speed sensor | 130: air conditioning pressure sensor |

-continued

<Description of symbols>

| | |
|---|---|
| 140: air conditioning switch sensor | 150: refrigerant temperature sensor |
| 160: intercooler temperature sensor | 170: position sensor |
| 210: first air duct | 220: wheel housing |
| 230: guide plate | 240: second air duct |
| 250: control valve | 255: valve shaft |

What is claimed is:

1. A system for controlling an air flow into a vehicle engine room, the system comprising:
an air intake port configured to receive an exterior air at a front portion of a vehicle and supply the exterior air into the engine room;
air ducts formed at both sides of the air intake port and configured to introduce the exterior air into a wheel side so as to improve aerodynamic characteristic;
a control valve configured to selectively convey the exterior air flowed in the air intake port into the air ducts;
a radiator disposed between the air intake port and the engine room; and
a control unit configured to control the control valve based on an operating state of the vehicle,
wherein the air ducts are selectively communicated with the air intake port and are disposed upstream of the radiator.

2. The system of claim 1, further comprising
a diversion passage formed between the air intake port and the air ducts and configured to supply the exterior air flowed in the air intake port into the air ducts,
wherein the control valve is positioned at an upstream side of the diversion passage, and
wherein the control valve having one end which is fixed at a valve shaft formed at an interior circumference of the diversion passage and an other end configured to rotate in a forward and reverse directions such that the diversion passage is selectively opened or closed.

3. The system of claim 2, wherein when the control valve is not operated, the control valve is configured to maintain in a state of rotating in the forward direction, and the exterior air flowed from the intake port is fully supplied to the radiator, and
when the control valve is operated, the control valve is configured to rotate in the reverse direction to open the diversion passage, and some air flowed from the intake port is supplied to the air ducts via the diversion passage.

4. The system of claim 3, wherein the air ducts include:
a front duct disposed at a front side of the vehicle in a length direction;
a rear duct disposed at a rear side of the front duct and configured to direct an air flowed from the front duct into the wheel side,
wherein the front duct is formed in a streamlined shape so as to smoothly receive the air from the front side of the vehicle and the more the front duct is positioned at a front side, the more the front duct is bent toward an inside of the vehicle, and
wherein the rear duct is formed in a shape such that the more the rear duct is positioned at a rear side, the more the rear duct is bent toward an outside of the vehicle.

5. The system of claim 4, further comprising a guide plate disposed at a downstream of the rear duct to guide the air into the wheel side,
wherein the air flowed out from the rear duct is directed to the outside of the vehicle while having a predetermined angle with a surface of a wheel.

6. The system of claim 4, further comprising
a fan shroud in which a cooling fan including a fan motor and a fan blade is mounted;
a rotary shutter which is provided in the fan shroud while corresponding to an operation area of the fan blade, and in which an area through which air passes is varied in a circumferential direction; and
a plurality of flaps which are provided in the fan shroud, and open and close a part of a portion where the rotary shutter is not mounted; and
wherein the control unit controls an open area of the rotary shutter, operations of opening and closing the plurality of flaps, an operation of the cooling fan, and an operation of the control valve based on the operating state of the vehicle.

7. The system of claim 6, wherein the rotary shutter includes:
a plurality of shutter blades which are provided to rotate about a rotation shaft; and
a shutter actuator which rotates the plurality of shutter blades, and changes an area through which air passes.

8. The system of claim 7, wherein the shutter blades include:
an operation blade which is rotated about the rotation shaft by the shutter actuator; and
a plurality of sub blades which are provided to be superimposed on a basis of the rotation shaft so as to be spread or folded fanwise in accordance with rotation of the operation blade.

9. The system of claim 8, wherein the shutter blades each have at least one operation protrusion, and
when the operation blade is spread or folded, any one of the plurality of sub blades is spread or folded, and remaining sub blades are sequentially spread or folded.

10. The system of claim 9, wherein electromagnets are provided on the plurality of flaps so that the plurality of flaps are opened and closed in accordance with an electric current supplied to the electromagnets.

11. The system of claim 6, wherein the fan shroud in which the rotary shutter and the plurality of flaps are provided is provided between an engine and the radiator.

12. The system of claim 11, further comprising an encapsulation which surrounds the engine room,
wherein operation modes of the system for controlling the air flow into the vehicle engine room include:
a first mode in which the plurality of flaps are closed, the rotary shutter is fully closed, and the operation of the cooling fan and the control valve are turned off;
a second mode in which the plurality of flaps are closed, the rotary shutter is fully opened, and the operation of the cooling fan and the control valve are controlled based on the operating state of the vehicle;
a third mode in which the plurality of flaps are opened, the rotary shutter is fully opened, the operation of the cooling fan is turned off, and the operation of the control valve is turned on; and
a fourth mode in which the plurality of flaps are closed, the open area of the rotary shutter is controlled, the operation of the cooling fan is turned off and the operation of the control valve is controlled based on the operation state of the vehicle.

13. The system of claim 12, wherein in the second and fourth modes, when a vehicle speed is in an acceleration state, the control valve controls the diversion passage to be opened, and when the vehicle speed is constant, the control valve controls the diversion passage to be closed.

14. The system of claim 13, further comprising
an atmospheric temperature sensor which measures an atmospheric temperature, and outputs a corresponding signal;
a speed sensor which measures the vehicle speed, and outputs a corresponding signal;
an air conditioning pressure sensor which measures air conditioning internal pressure, and outputs a corresponding signal;
an air conditioning switch sensor which measures an operational signal of an air conditioning switch, and outputs a corresponding signal;
a refrigerant temperature sensor which measures a refrigerant temperature, and outputs a corresponding signal; and
a position sensor which measures the open area of the rotary shutter, and outputs a corresponding signal,
wherein the control unit determines the operating state of the vehicle based on the corresponding signals from the respective sensors, and controls operations of the rotary shutter, the plurality of flaps, the cooling fan, and the control valve based on the operating state of the vehicle in any one mode of the first to fourth modes.

15. The system of claim 14, further comprising an intercooler temperature sensor which measures a temperature of an intercooler, and outputs a corresponding signal,
wherein the control unit further receives a signal from the intercooler temperature sensor so as to determine the operating state of the vehicle, and controls operations of the rotary shutter, the plurality of flaps, the cooling fan, and the control valve in any one mode of the first to fourth modes.

16. A control method of a system for controlling an air flow into a vehicle engine room, the system comprising:
an atmospheric temperature sensor configured to measure an atmospheric temperature;
a speed sensor configured to measure a vehicle speed;
an air conditioning pressure sensor configured to measure air conditioning internal pressure;
an air conditioning switch sensor configured to measure an operational signal of an air conditioning switch;
a refrigerant temperature sensor configured to measure a refrigerant temperature;
a fan shroud in which a cooling fan including a fan motor and a fan blade is mounted;
a rotary shutter which is provided in the fan shroud while corresponding to an operation area of the fan blade, and in which an area through which air passes is varied in a circumferential direction;
a position sensor configured to measure an open area of the rotary shutter;
a plurality of flaps which are provided in the fan shroud, and open and close a part of a portion where the rotary shutter is not mounted;
an air intake port receiving an exterior air at a front portion of a vehicle and supplying the exterior air into the engine room;
air ducts formed at both sides of the air intake port and configured to introduce the exterior air into a wheel side; and
a control valve configured to selectively convey the air flowed in the air intake port into the air ducts; and a control unit configured to control an open area of the rotary shutter, operations of opening and closing the plurality of flaps, an operation of the cooling fan, and an operation of the control valve based on an operating state of the vehicle,
the method comprising:
determining, by the control unit, the operating state of the vehicle based on sensor signals from the atmospheric temperature sensor, the speed sensor, the air conditioning pressure sensor, the air conditioning switch sensor, the refrigerant temperature sensor, and the position sensor; and
determining whether to close or open the rotary shutter based on the determined operating state of the vehicle; and
fully closing, by the control unit, the rotary shutter, and when the rotary shutter is fully closed, closing the plurality of flaps, turning off the operation of the cooling fan, and turning on the operation of the control valve.

17. The method of claim 16, further comprising:
turning off the control valve to cut off a diversion passage;
determining, by the control unit, whether the operating state of the vehicle corresponds to a predetermined low-speed and high-load condition when the rotary shutter is not fully closed; and
fully opening, by the control unit, the rotary shutter, closing the plurality of flaps, and controlling the operation of the cooling fan and the control valve based on the operating state of the vehicle when the operating state of the vehicle corresponds to the predetermined low-speed and high-load condition.

18. The method of claim 17, wherein when the operating state of the vehicle corresponds to the predetermined low-speed and high-load condition, the control valve by the control unit opens the diversion passage when the vehicle speed is in an acceleration state, and closes the diversion passage when the vehicle speed is in a constant state,
determining, by the control unit, whether the operating state of the vehicle corresponds to a predetermined high-speed and high-load condition when the operating state of the vehicle does not correspond to the predetermined low-speed and high-load condition; and
fully opening, by the control unit, the rotary shutter, opening the plurality of flaps, turning off the operation of the cooling fan, turning on the control valve when the operating state of the vehicle corresponds to the predetermined high-speed and high-load condition.

19. The method of claim 18, further comprising, when the operating state of the vehicle does not correspond to the predetermined high-speed and high-load condition,
controlling, by the control unit, the operation of the control valve based on the operating state of the vehicle; and
closing, by the control unit, the plurality of flaps, turning off the operation of the cooling fan, and controlling an open area of the rotary shutter in accordance with the operating state of the vehicle;
wherein, when the control unit determined that full closing of the rotary shutter is not required and the operating state of the vehicle does not corresponds to the predetermined low-speed and high-load condition, the control valve opens the diversion passage when the vehicle speed is in the acceleration state, and closes the diversion passage when the vehicle speed is in the constant state.

20. The method of claim 19, wherein the system for controlling the air flow into the vehicle engine room further includes an intercooler temperature sensor which measures a temperature of an intercooler, and outputs a corresponding signal, and the control unit configured to receive the signal from the intercooler temperature sensor and determine the operating state of the vehicle.

* * * * *